United States Patent
Longa et al.

(10) Patent No.: US 7,991,154 B2
(45) Date of Patent: Aug. 2, 2011

(54) EXPONENTIATION METHOD USING MULTIBASE NUMBER REPRESENTATION

(75) Inventors: Patrick Longa, Kitchener (CA); Seyed Ali Miri, Ottawa (CA); Luis Orozco Barbosa, Albacete (ES)

(73) Assignee: Univeristy of Castilla-La Mancha, Albacete (ES)

( * ) Notice: Subject to any disclaimer, the term of this patent is extended or adjusted under 35 U.S.C. 154(b) by 592 days.

(21) Appl. No.: 12/152,450

(22) Filed: May 14, 2008

(65) Prior Publication Data

US 2009/0323933 A1  Dec. 31, 2009

(51) Int. Cl.
*H04L 9/00* (2006.01)
(52) U.S. Cl. ........................................ 380/30
(58) Field of Classification Search ............... 380/28, 380/30, 280, 1, 29, 44, 282, 286; 713/189
See application file for complete search history.

(56) References Cited

U.S. PATENT DOCUMENTS

| | | | |
|---|---|---|---|
| 2002/0057796 A1* | 5/2002 | Lambert et al. | 380/28 |
| 2004/0158597 A1* | 8/2004 | Ye et al. | 708/492 |
| 2005/0169462 A1* | 8/2005 | Jung et al. | 380/28 |
| 2006/0029222 A1* | 2/2006 | Lambert et al. | 380/28 |
| 2006/0093137 A1* | 5/2006 | Izu et al. | 380/30 |
| 2007/0198824 A1* | 8/2007 | Chen et al. | 713/150 |
| 2007/0291937 A1* | 12/2007 | Katagi et al. | 380/30 |
| 2008/0044010 A1* | 2/2008 | Vasyltsov | 380/28 |
| 2008/0219438 A1* | 9/2008 | Ebeid | 380/30 |
| 2009/0074178 A1* | 3/2009 | Longa et al. | 380/28 |
| 2010/0067690 A1* | 3/2010 | Han et al. | 380/44 |

* cited by examiner

*Primary Examiner* — Beemnet Dada
(74) *Attorney, Agent, or Firm* — Garvey, Smith, Nehrbass & North, L.L.C.; Brett A. North

(57) ABSTRACT

A method of scalar multiplication for use in elliptic curve-based cryptosystems (ECC) is provided. Scalars are represented using a generic multibase form combined with the non-adjacency property, which greatly reduces the nonzero density in the representation. The method allows for flexibly selecting an unrestricted number of bases and their weight in the representation according to the particular characteristics of a setting, in such a way that computing costs are minimized. A simple, memory-friendly conversion process from binary to multibase representation and an inexpensive methodology to protect the multibase scalar multiplication against simple-side channel attacks are also provided.

20 Claims, 5 Drawing Sheets

EXPONENTIATION METHOD USING MULTIBASE NUMBER REPRESENTATION

TECHNICAL FIELD

The present invention relates to security technology, specifically, it relates to the computation of elliptic curve scalar multiplication.

BACKGROUND

Elliptic curve cryptosystems (ECC) are public-key cryptosystems that have attracted increasing attention in recent years due to their shorter key length requirement in comparison with other public-key cryptosystems such as RSA.

Public-key cryptosystems make use of a pair of keys, called public and private keys, to perform cryptographic operations such as encryption/decryption of data and signing/verification of digital signatures. In particular for ECC, in some protocols private keys are scalar values that are kept in secret, and public keys are points on the elliptic curve that are made public. Given a secret scalar k and points P and kP on a elliptic curve, where kP is a multiple of the point P, the elliptic curve discrete logarithm problem (ECDLP) is defined as the problem of determining k, with P and kP known. The ECDLP problem is thought to be hard to solve, and the difficulty to solve it is precisely the security foundation of EC-based systems.

ECC can be defined over different finite fields. Most important finite fields used to date to implement this cryptosystem have been binary, prime and extension fields. Finite fields are denoted by GF(q), where q is a prime power of the form $p^m$ (p prime) and also represents the number of elements (order) of the field. If m=1, this field is referred to as prime field. If, otherwise, m≧2 then it is known as extension field. The particular case m=2 among extension fields is also known as binary field.

For the case of prime fields, the generic equation to represent an elliptic curve is given by:

$$E: y^2 = x^3 + ax + b,$$

where: $a, b \in GF(p)$ and $\Delta = 4a^3 + 27b^2 \neq 0 \pmod{p}$ ($\Delta$ denotes the discriminant of the curve E).

For the case of binary fields, the generic equation to represent an elliptic curve is given by:

$$E: y^2 + xy = x^3 + ax^2 + b,$$

where: $a, b \in GF(2^m)$ and $\Delta = b \neq 0$.

Other variants of elliptic curve forms that also use prime, extended and/or binary fields can be found in the literature. Some examples are: Hessian and Jacobi forms, Edwards curves, Montgomery curves, elliptic curves of degree ⅔ isogenies, among others.

The central and most time-consuming operation in ECC is scalar multiplication, which is generally represented by kP. This operation can be interpreted as the result of adding the point P to itself (i.e., P+P+ . . . +P) (k−1) times, where k is a scalar of very large value. Currently, a secure ECC system uses scalars with bit lengths in the range [160,512], where larger values provide higher security level.

Another important aspect related to the deployment of a cryptosystem is its vulnerability to attacks exploiting side-channel information.

Side-channel information, such as power dissipation and electromagnetic emission, leaked by real-world devices has been shown to be highly useful for revealing private keys and effectively breaking the otherwise mathematically-strong ECC cryptosystem.

There are two main strategies to these attacks: simple (SSCA) and differential (DSCA) side-channel attacks. SSCA is based on the analysis of a single execution trace of a scalar multiplication to guess the secret key by revealing the sequence of operations used in the execution of ECC point arithmetic.

Extensive research has been carried out to yield effective countermeasures to deal with SSCA. Among them, side-channel atomicity dissolves point operations into small homogenous blocks, known as atomic blocks, which cannot be distinguished from one another through simple side-channel analysis because each one contains the same pattern of basic field operations. Furthermore, atomic blocks are made sufficiently small to make this approach inexpensive. For example the structure M-A-N-A (field multiplication, addition, negation, addition) has been proposed to build SSCA-protected point operations over prime fields.

However, the main drawback of the traditional M-A-N-A structure is that it relies on the assumption that field multiplication and squaring are indistinguishable from each other. In software implementations, timing and power consumption have been shown to be quite different for these operations, making them directly distinguishable through power analysis. Furthermore, from a performance viewpoint, the M-A-N-A structure is not optimal in several settings where the increased number of field additions that it requires becomes non-negligible.

Nowadays, embedded computers dominate the marketplace. They are used in almost every new application requiring certain computing capabilities, especially in those involving consumer devices. A very important issue involves providing adequate security to these applications. However, this task seems to contrast with the effort by manufacturers of reducing product cost, size and power consumption. It is therefore a challenging task to make possible the implementation of cryptographic systems on these constrained devices. In particular for ECC, there is a need for accelerating the scalar multiplication without impacting memory and keeping it protected against side-channel attacks, in such a way that its implementation can be realized in the myriad of new devices with limited resources.

SUMMARY

The disclosure provides a method for accelerating scalar multiplication by representing the scalar value with a short multibase representation. A method that converts any positive integer (scalar) to such representation without requiring additional memory resources is also provided.

In accordance with the present disclosure there is provided a method of accelerating scalar multiplication in an elliptic curve-based cryptosystem by representing a scalar value with a multibase representation comprising the steps of: a) selecting a set of bases and corresponding set of window values for performing an ECC scalar multiplication; b) calculating precomputed values according to selected bases and window values wherein the precomputed values are points of a form $d_iP$, where $d_i \in D^+ \setminus \{0\}$ and P is a point on a elliptic curve for which a ECC scalar multiplication kP is computed; c) determining a multibase representation of the selected scalar value; and d) scanning digits of the multibase representation from left to right until all the digits of the multibase representation are exhausted, performing a point operation of the form $a_jQ$ for every scanned digit with associated, base $a_j \in A$, and performing an additional point addition of a form $Q=Q \pm d_iP$ if a digit has nonzero value $d_i$, where $d_iP$ is a point of the precomputed table and Q is a partial result of the scalar multiplication.

In accordance with the present disclosure there is provided an apparatus for accelerating scalar multiplication in an elliptic curve-based cryptosystem by representing a scalar value with a multibase representation, the apparatus comprising: a memory; a processor for performing the steps of: a) selecting a set of bases and corresponding set of window values for performing an ECC scalar multiplication; b) calculating precomputed values according to selected bases and window values wherein the precomputed values are points of a form $d_iP$, where $d_i \in D^+\setminus\{0\}$ and P is a point on a elliptic curve for which a ECC scalar multiplication kP is computed; c) determining a multibase representation of the selected scalar value; and d) scanning digits of the multibase representation from left to right until all the digits of the multibase representation are exhausted, performing a point operation of the form $a_jQ$ for every scanned digit with associated base $a_j \in A$, and performing an additional point addition of a form $Q=Q \pm d_iP$ if a digit has nonzero value $d_i$, where $d_iP$ is a point of the precomputed table and Q is a partial result of the scalar multiplication.

In accordance with the present disclosure there is provided a computer readable medium containing instructions for accelerating scalar multiplication in an elliptic curve-based cryptosystem by representing a scalar value with a multibase representation, the instructions which when executed by a processor perform the steps of: a) selecting a set of bases and corresponding set of window values for performing an ECC scalar multiplication; b) calculating precomputed values according to selected bases and window values wherein the precomputed values are points of a form $d_iP$, where $d_i \in D^+\setminus\{0\}$ and P is a point on a elliptic curve for which a ECC scalar multiplication kP is computed; c) determining a multibase representation of the selected scalar value; and d) scanning digits of the multibase representation from left to right until all the digits of the multibase representation are exhausted, performing a point operation of the form $a_jQ$ for every scanned digit with associated base $a_j \in A$, and performing an additional point addition of a form $Q=Q \pm d_iP$ if a digit has nonzero value $d_i$, where $d_iP$ is a point of the precomputed table and Q is a partial result of the scalar multiplication.

The multibase representation may be of the form:

$$k = \sum_{i=1}^{m} s_i \prod_{j=1}^{J} a_j^{c_j(i)},$$

where: positive prime integers $a_1 \neq a_2 \neq \ldots \neq a_J$ are selected bases determining the set $A=\{a_1, \ldots, a_J\}$, global base $a=a_1^{w_1}a_2^{w_2}\ldots a_J^{w_J}$ is set using a selected window set $\Omega=\{w_1, w_2, \ldots, w_J\}$, where $w_j \geq 0$ for $1 \leq j \leq J$, $s_i$ are signed digits from the set $D\setminus\{0\}$, s.t. $|s_i| \geq 1$ and $s_i \in D\setminus\{0\}$, where the digit set is given by:

$$D = \left\{0, \pm 1, \pm 2, \ldots, \pm \left\lfloor \frac{a-1}{2} \right\rfloor \right\} \setminus \ldots \ldots \left\{\pm 1a_1, \pm 2a_1, \ldots, \pm \left\lfloor \frac{a-1}{2a_1} \right\rfloor a_1, \right.$$
$$\left. \pm 1a_2, \pm 2a_2, \ldots, \pm \left\lfloor \frac{a-1}{2a_2} \right\rfloor a_2, \ldots, \pm 1a_J, \pm 2a_J, \ldots, \pm \left\lfloor \frac{a-1}{2a_J} \right\rfloor a_J \right\},$$

$c_i(j)$ are decreasing exponents, s.t. $c_i(j) \geq c_{i+1}(j)+w_j \geq w_j$ for $1 \leq i \leq m-1$ and each $1 \leq j \leq J$, and m is the length of the expansion.

In addition there is provided for protecting scalar multiplication against simple side-channel attacks using atomic structures that offer higher security level and/or lower computational overhead.

Other aspects and features will become apparent to those ordinarily skilled in the art upon review of the following description in conjunction with the accompanying figures.

BRIEF DESCRIPTION OF THE DRAWINGS

Further features and advantages will become apparent from the following detailed description, taken in combination with the appended drawings, in which.

It should be noted that throughout the appended drawings, like features are identified by like reference numerals.

DETAILED DESCRIPTION

Figure 1:
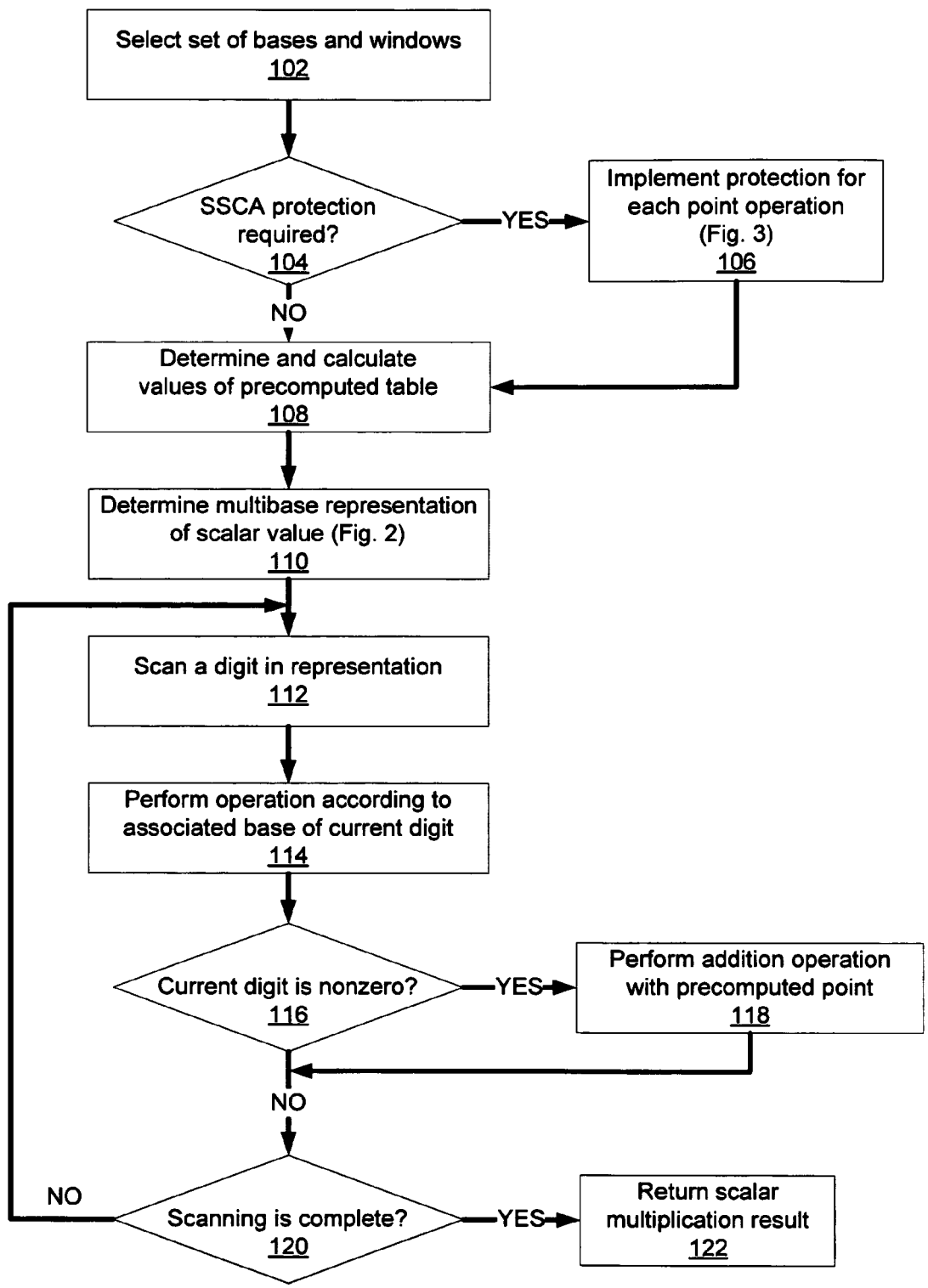
FIG. 1 is a flow diagram for computing scalar multiplications using multibase-number representation.

Embodiments are described below, by way of example only, with reference to FIGS. 1-5. A system and method are provided for accelerating scalar multiplication by representing the scalar value with a short multibase representation, which is obtained by means of a conversion methodology that does not require additional memory resources.

A direct calculation of a scalar multiplication of the form kP would involve adding P to itself (i.e., $P+P+ \ldots +P$) (k-1) times. This procedure is highly time consuming for typical sizes of k. A straightforward improvement would be representing the scalar value using a binary representation with elements $\{0,1\}$. Thus, scalar multiplication becomes more efficient by using the two basic ECC point operations, namely doubling (2P) and addition (P+Q) of points, where P and Q are points on the elliptic curve. The nonzero density of the binary representation is about ½. Hence, the average cost of a scalar multiplication in this case is approximately $(n-1)D+(n/2)A$, where n is the average bit length of a randomly chosen scalar k, and D and A represent cost of point doubling and addition, respectively.

By observing that additive inverses of ECC points (e.g., -P) are very inexpensive to compute, one can make use of a signed binary representation. Among different signed radix-2 representations using elements in the set $D=\{0,\pm\}$, Non-Adjacent Form (NAF) is a canonical representation with the fewest number of nonzero digits for any scalar value. The NAF representation of a scalar contains at most one nonzero digit among any two successive digits. The expected nonzero density of this representation is 1/3. Hence, the average cost of a scalar multiplication using NAF is approximately (n−1)D+(n/3)A.

If there is memory available, one can make use of precomputations to reduce the computing time further. This method is known as Window-w NAF (wNAF), and it basically exploits the availability of precomputed values to "insert" windows of width w, which permits the consecutive execu- $$kP = \left(\sum_{i=1}^{m} s_i \prod_{j=1}^{J} a_j^{c_i(j)}\right) P =$$

$$\prod_{j=1}^{J} a_j^{d_m(j)} \left(\prod_{j=1}^{J} a_j^{d_m(j)} \left( \ldots \left(\prod_{j=1}^{J} a_j^{d_1(j)}(s_1 P) + s_2 P\right) + \ldots + s_{m-1} P\right) + s_m P\right)$$

tion of several doublings to reduce the density of the expansion. The wNAF representation of a scalar contains at most one nonzero digit among any w successive digits. The average density of nonzero digits for a window of width w is $D_{wNAF}=1/(w+1)$, and the number of required precomputed points is $(2^{w-2}-1)$ (hereafter we refer as precomputed points to non-trivial points not including $\{O,P\}$). Thus, the cost using this method is approximately (n−1)D+(n/(w+1))A.

Other alternative methods exist. However, they provide mixed results because may achieve lower computing costs but involve very expensive requirements in terms of memory. For instance, although the evaluation stage of the scalar multiplication using the double-base number system (DBNS) can be sped up by reducing the required number of point additions, converting a number to DBNS representation is very costly in terms of speed and memory. The latter is especially impractical in constrained devices such as smartcards, RFIDs and many others.

In the present disclosure, a system and method is described that computes the scalar multiplication using a generic multibase representation with the objective of reducing the time execution by utilizing short multibase representations without impacting memory is also provided.

The following multibase representation is provided for the representation of a given scalar k:

$$k = \sum_{i=1}^{m} s_i \prod_{j=1}^{J} a_j^{c_i(j)}, \qquad (1)$$

where:
bases $a_1 \neq a_2 \neq \ldots \neq a_J$ are positive prime integers from a set of bases $A=\{a_1, \ldots, a_J\}$,
$s_i$ are signed digits from a given set $D\backslash\{0\}$, i.e., $|s_i|\geq 1$ and $s_i \in D\backslash\{0\}$.
$c_i(j)$ are decreasing exponents, and
m is the length of the expansion.

In addition, a global base $a=a_1^{w_1} a_2^{w_2} \ldots a_J^{w_J}$ is defined, using window set $\Omega=\{w_1, w_2, \ldots, w_J\}$, where $w_j \geq 0$ for $1 \leq j \leq J$, and impose the following restriction:

$$c_i(j) \geq c_{i+1}(j)+w_j \geq w_j \text{ for } 1 \leq i \leq m-1 \text{ and each } 1 \leq j \leq J.$$

The previous condition guarantees that an expansion of the form (1) is efficiently executed by a scalar multiplication using Horner's method as follows:

where $d_m(j) \geq 0$, and $d_i(j) \geq w_j$ for $1 \leq i \leq m-1$ and $1 \leq j \leq J$.

For efficiency purposes, the multibase representation requires a digit set of the form $$D = \left\{0, \pm 1, \pm 2, \ldots, \pm \left\lfloor \frac{a-1}{2} \right\rfloor\right\} \backslash \ldots \ldots \qquad (2)$$

$$\left\{\pm 1 a_1, \pm 2 a_1, \ldots, \pm \left\lfloor \frac{a-1}{2a_1} \right\rfloor a_1, \pm 1 a_2, \pm 2 a_2, \ldots, \right.$$

$$\left. \pm \left\lfloor \frac{a-1}{2a_2} \right\rfloor a_2, \ldots, \pm 1 a_J, \pm 2 a_J, \ldots, \pm \left\lfloor \frac{a-1}{2a_J} \right\rfloor a_J\right\},$$

where there are only considered digits that are not multiples of the bases.

The multibase representation provided permits to flexibly define the set of bases that are the most efficient for a given setting. Also, it permits to specify well-defined distances between exponents by means of the highly flexible global base. It will become evident in the following paragraphs that the latter allows for devising efficient methods to convert numbers to short multibase representations.

FIG. 1 illustrates a method for computing the scalar multiplication using a representation of the form (1). At step 102, the method involves first defining or selecting the set of bases and windows to use according to the characteristics of a given setting. In particular, to include a given base $a_j$ in the representation it is determined whether or not performing an operation of the form $a_j Q$, where Q is a point on the elliptic curve, is relatively efficient. For instance, doubling (i.e., $a_j=2$) is a highly efficient operation in most common elliptic curve forms, so it should be included to achieve the highest performance when working with these specific curves.

In the case of the window set, the window values should be defined for each base $a_j$ according to the relative performance of the corresponding operation $a_j Q$ and also taking into account memory restrictions.

Figure 3:
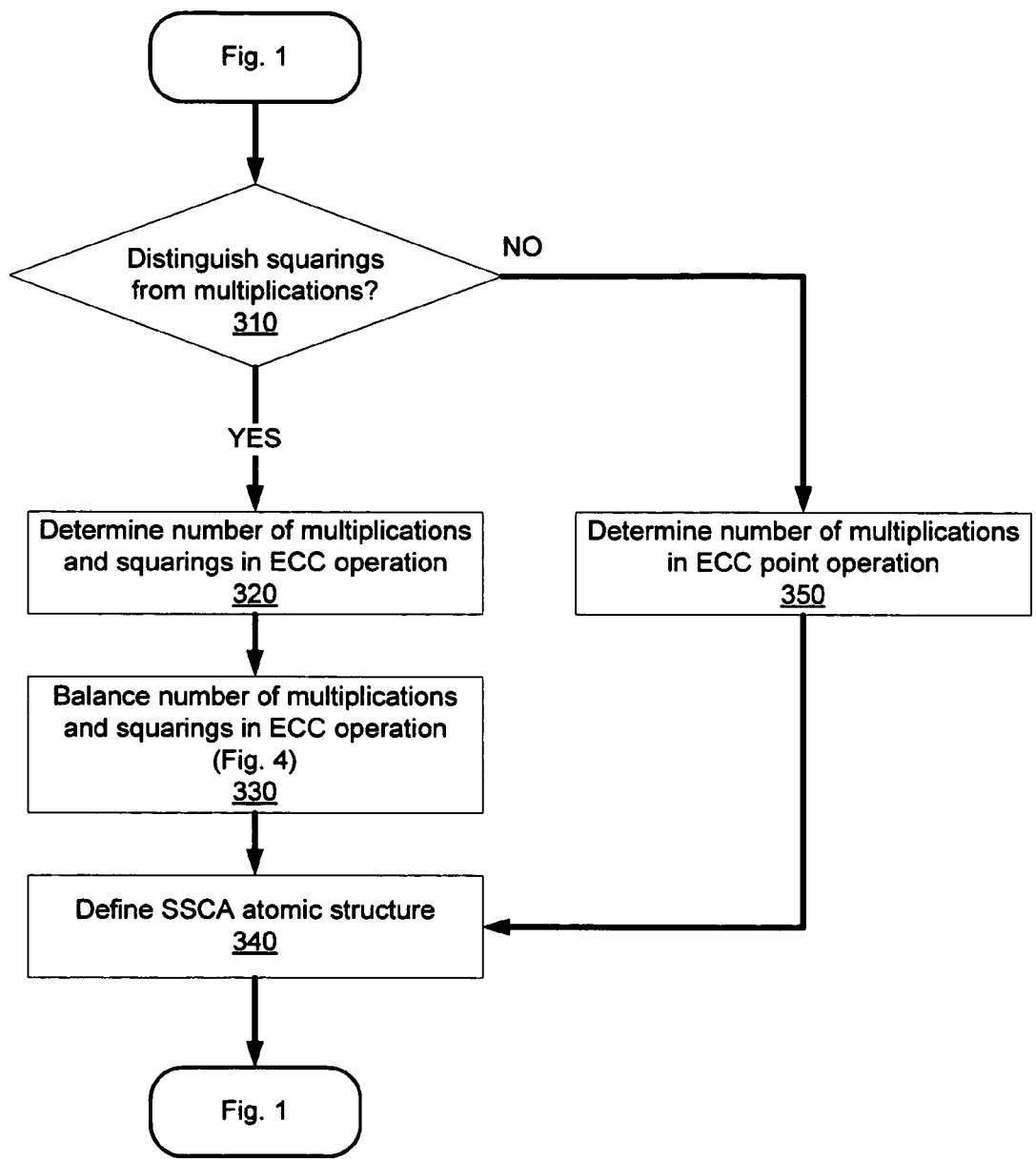
FIG. 3 is a flow diagram showing the method of protecting against simple side-channel attacks.

Once the set of bases has been defined, and according to the particular application, at step 104 it is determined if SSCA protection is required. If it is required, YES at step 104, at step 106 the method depicted by FIG. 3 is executed to protect all the operations of the form $a_jQ$, and also point addition.

If SSCA is not required, NO at step 104, at step 108 the values of the precomputed table are calculated. Specifically, in the case of multibase representation, the table consists of all the points of the form $d_iP$, where $d_i \in D^+ \backslash \{0\}$ (see (2)).

Figure 2:
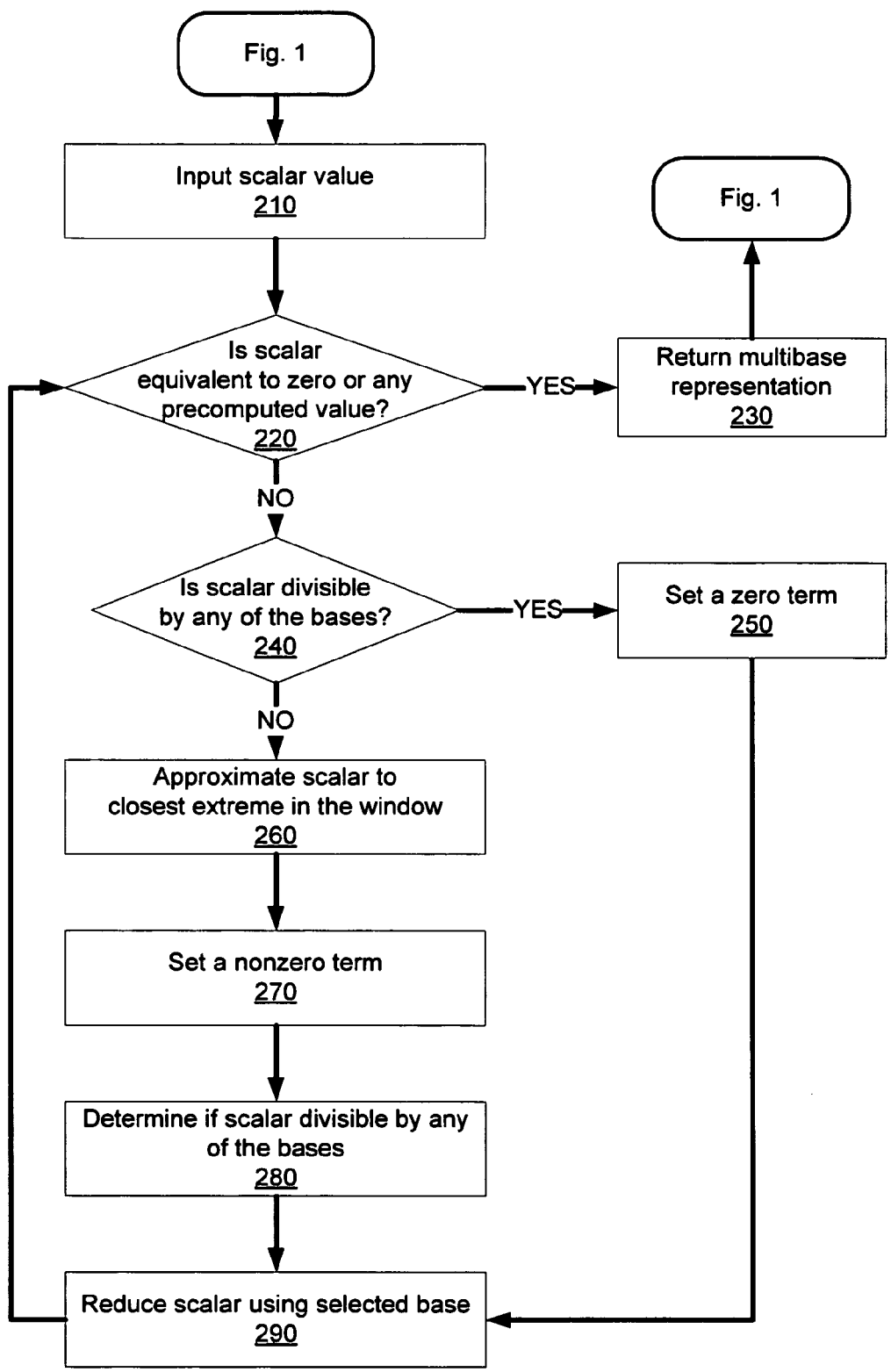
FIG. 2 is a flow diagram for converting any scalar value to multibase representation.

At step 110, the procedure depicted by FIG. 2 is executed to determine the multibase representation of the scalar value. Then, the value of the scalar multiplication is computed by scanning the obtained multibase representation digit by digit. Per digit scanned, a step 112, one operation of the form $a_jQ$ is executed, where $a_j$ is the specific base associated to the current digit at step 114.

If the digit scanned is nonzero, YES at step 116, then one addition of the form $Q \pm d_iP$ is performed at step 118, where Q is the current value of the scalar multiplication and $d_iP$ is a point from the precomputed table. Note that the value $\pm d_i$ corresponds to the value of the scanned digit. Although, the precomputed table only contains positive values, it has been stated previously that computing inverses of points (in this case, $-d_iP$) is inexpensive and can be calculated on-the-fly.

If the scanning is complete, YES at step 120, all the digits in the multibase representation has been scanned, and the result of the scalar multiplication is provided at step 122.

In the following, a method is described that determines short multibase representations of scalar values.

Referring to FIG. 2, short multibase representations of the scalar value are determined. Inputs the scalar value are provided at step 210, and then at step 220 begins the execution while the initial or partial value of the scalar is different from zero and any value of the precomputed table. Once it reaches zero, YES at step 220, the method ends and gives the multibase representation of the input scalar at step 230.

At each iteration, and while the partial value of the scalar is other than zero, NO at step 220, it is determined at step 240 if the scalar is divisible by one of the bases. For a given set of bases $A=\{a_1, \ldots, a_J\}$, the test of divisibility begins with $j=1$ and stops when $j=J$ or if a base divides the scalar value. If one of the bases is successfully selected, YES at step 240, then a zero digit is set at step 250 together with its corresponding base, and the scalar value is updated by dividing it by the base in step 290.

If, otherwise, NO at step 240, the scalar is not divisible by any of the bases, at step 260 its value is approximated to the closest extreme in the predefined window by performing an addition of the form $k=k \pm d_i$ where $d_i \in D^+ \backslash \{0\}$ (see (2)), For this approximation to guarantee a successive execution of at least $(w_1+w_2+\ldots+w_J)$ operations of the form $a_jQ$ in posterior executions, the window is delimited by the two closest integers to the partial scalar value that are multiples of the global base. Then, the corresponding digit is set to the nonzero value $\pm d_i$ in step 270.

At step 280, it is performed again the test of divisibility as was described previously. The base selected is associated to the nonzero digit from step 270. Note that, although the test of divisibility has a predetermined order, the set of bases is efficiently specified by according to the characteristics of the particular setting.

Finally, the scalar value is updated by dividing it by the selected base in step 290. It is then determined at step 220 if the scalar is equivalent to zero or one of the values of the precomputed table.

By way of example only, and to illustrate the way methods of FIGS. 1 and 2 work during a scalar multiplication execution, two kinds of parameter selections are distinguished that are efficient for different settings, and explain their particular characteristics through examples.

Multibase Non-Adjacent Form (mbNAF)

In the first case, it is assumed that a given application has very constrained memory resources. Thus, the use of precomputations should be minimized. For the disclosed multibase representation, the latter can be achieved by imposing the following additional restrictions to exponents $c_i(j)$ in (1):

$c_i(j)$ are decreasing exponents, such that $c_1(j) \geq c_2(j) \geq \ldots \geq c_m(j) \geq 0$ for each j from 2 to J, and $c_i(1)$ are decreasing exponents for the main base $a_1$ (i.e., $j=1$), such that $c_i(1) \geq c_{i+1}(1)+2 \geq 2$, for $1 \geq i \geq m-1$.

Assuming the previous extra conditions implies that $\Omega=\{2, 0, \ldots, 0\}$, where only the first base $a_1$ (which is referred to as main base) has nonzero window value, and consequently, the global base becomes $a=a_1^2 a_2^0 \ldots a_J^0=a_1^2$. From (2), it can be seen that these parameters reduces the digit set to:

$$D = \left\{0, \pm 1, \pm 2, \ldots, \pm \left\lfloor \frac{a_1^2-1}{2} \right\rfloor \right\} \backslash \left\{\pm 1 a_1, \pm 2a_1, \ldots, \pm \left\lfloor \frac{a_1-1}{2} \right\rfloor a_1 \right\}, \quad (3)$$

which minimizes the required number of precomputations to only $$\frac{(a_1-2)(a_1+1)}{2}$$

precomputed points without considering $\{O,P\}$.

Consider the computation of 3750P, where $k=3750$ is the selected scalar and P is a point on a generic elliptic curve over a prime field. First, we select the set of bases $A=\{2,3\}$ and windows $\Omega=\{2,0\}$ as per step 102, FIG. 1. Note that $a_1=2$ and $a_2=3$ are selected as bases because point doubling (2Q) and tripling (3Q) are relatively efficient in the chosen curve form. In particular, doubling is the most efficient operation and hence selected as main base.

Assuming that SSCA protection is not required, in step 108 the precomputed table $d_iP$ is built. In this case, $d_i \in D^+ \backslash \{0\}=\{1\}$ (see (3)), so that it is only required to store nil non-trivial points and the trivial points $\{O,P\}$.

Then, the multibase representation is determined as per FIG. 2. In the example, the procedure to find the representation follows the next sequence $$\frac{3750}{2} \to \frac{1875}{3} \to 625-1 \to$$

$$\frac{624}{2} \to \frac{312}{2} \to \frac{156}{2} \to \frac{78}{2} \to \frac{39}{3} \to 13-1 \to \frac{12}{2} \to \frac{6}{2} \to \frac{3}{3} \to 1$$

which sets the following digit-wise representation using digits from D (see (3)) $(2,3)NAF_2(3750)=1^{(2)}0^{(3)}0^{(2)}1^{(2)}0^{(3)}0^{(2)}0^{(2)}0^{(2)}1^{(2)}0^{(3)}0^{(2)}$,
where the superscript $(a_j)$ represents the base associated with a given digit. Note that the notation $(a_1,a_2)NAF_{w_1}(k)$ is used to represent the mbNAF representation of k using bases $A=\{a_1, a_2\}$ and windows $w_1 \neq 0$ and $w_2 = 0$.

In a scalar multiplication the execution consists of scanning the multibase representation from left to right, and performing a doubling if the digit is $0^{(2)}$, a tripling if it is $0^{(3)}$, and a doubling or tripling followed by an addition if it is $\pm 1^{(2)}$ or $\pm 1^{(3)}$, respectively, as described previously for steps 112-122, FIG. 1. The correctness of the procedure can be verified by checking that the previous execution is equivalent to the following using Horner's method, where the execution begins in the most inner parentheses $$3750P = 2 \times 3(2^4 \times 3(2^2 \times 3P + P) + P).$$

According to the example above, the scalar multiplication 3750P costs 7D+3T+2A, which translates to a cost of 107.2M if 1S=0.8M. The cost of doubling (D) is 3 multiplications (M) and 5 squarings (S), the cost of tripling (T) is 7M+7S and the cost of addition is 7M+4S. In contrast a traditional NAF method would cost 12D+5A=135M, which is significantly more expensive in terms of computational effort.

Window-w Multibase Non-Adjacent Form (wmbNAF)

In another scenario, assume that the application has additional memory resources that can be exploited to store precomputations and, thus, speed up the execution of the multibase scalar multiplication. This variation is referred as Window-w Multibase NAF (or simply wmbNAF).

The proposed multibase representation is achieved by imposing the following additional restrictions to exponents $c_i(j)$ in (1):

$c_i(j)$ are decreasing exponents, such that $c_1(j) \geq c_2(j) \geq \ldots \geq c_m(j) \geq 0$ for each j from 2 to J, and $c_1(1)$ are decreasing exponents for the main base $a_1$ (i.e., j=1), such that $c_i(1) \geq c_{i+1}(1) + w_1 \geq w_1$, for $1 \leq i \leq m-1$, where $w_1 > 2 \epsilon Z^+$.

Assuming the previous extra conditions implies that $\Omega = \{w_1, 0, \ldots, 0\}$, where only the first base $a_1$, (which is referred to as main base) has nonzero window value, and consequently, the global base becomes $a = a_1^{w_1} a_2^0 \ldots a_j^0 = a_1^{w_1}$. From (2), it can be seen that these parameters reduces the digit set to:

$$D = \left\{0, \pm 1, \pm 2, \ldots, \pm \left\lfloor \frac{a_1^{w_1} - 1}{2} \right\rfloor \right\} \backslash \qquad (4)$$

$$\left\{\pm 1a_1, \pm 2a_1, \ldots, \pm \left\lfloor \frac{a_1^{w_1-1} - 1}{2} \right\rfloor a_1 \right\},$$

which requires to precompute a table with $$\frac{a_1^{w_1} - a_1^{w_1-1} - 2}{2}$$

points without considering {O,P}. Although this parameter selection does not minimize the number of precomputations, it will enable further reductions in the number of nonzero terms appearing in the multibase representation. This makes the computation even faster.

Consider again the computation of 3750P on a generic elliptic curve over a prime field. First, the set of bases $A=\{2, 3\}$ and windows $\Omega=\{5,0\}$ were selected as per step 102, FIG. 1.

Assuming that SSCA protection is not required, in step 108 the precomputed table $d_iP$ is built. In this case, $d_i \epsilon D^+ \backslash \{0\} = \{1, 3, 5, \ldots, 15\}$ (see(4)), so that it is required to store 7 non-trivial points and the trivial points {O,P}.

Then, the multibase representation is determined as per FIG. 2. In the example, the procedure to find the representation follows the next sequence $$\frac{3750}{2} \rightarrow$$

$$\frac{1875}{3} \rightarrow 625 + 15 \rightarrow \frac{640}{2} \rightarrow \frac{320}{2} \rightarrow \frac{160}{2} \rightarrow \frac{80}{2} \rightarrow \frac{40}{2} \rightarrow \frac{20}{2} \rightarrow \frac{10}{2} \rightarrow 5$$

which sets the following digit-wise representation using digits from D (see (4)) $(2,3)NAF_5(3750) = 5^{(2)}0^{(2)}0^{(2)}0^{(2)}0^{(2)}0^{(2)}0^{(2)} -15^{(2)}0^{(3)}0^{(2)}$,
where again the superscript $(a_j)$ represents the base associated with a given digit. The notation $(a_1,a_2)NAF_{w_1}(k)$ is used to represent the wmbNAF representation of k using bases $A=\{a_1,a_2\}$ and windows $w_1 > 2$ and $w_2 = 0$.

As previously described, following procedure for steps 112-122, FIG. 1, the execution of the scalar multiplication would be performed by scanning digits from left to right, and performing a doubling if the digit is $0^{(2)}$, a tripling if it is $0^{(3)}$, and a doubling or tripling followed by an addition if it is $\pm d_i^{(2)}$ or $\pm d_i^{(3)}$, respectively, where $d_i \epsilon D^+ \backslash \{0\} = \{1, 3, 5, \ldots, 15\}$. This procedure is equivalent to the following using Horner's method $$3750P = 2 \times 3(2^7 \times 5P - 15P).$$

According to the example above, the scalar multiplication 3750P costs 8D+1T+1A=78.8M, if 1S=0.8M. Compare this cost to the traditional wNAF method with window w=5: 12D+2A=104.4M, which is significantly more expensive in terms of computational effort although requires the same amount of memory.

FIG. 3 presents a methodology for the case where protection against SSCA needs to be implemented. The procedure is described in the following.

According to the particular application, if it is determined that protection is to be implemented, at step 310 it is determined if ECC point operations such as doubling, tripling or addition are to be implemented either by distinguishing field squarings from multiplications or by assuming that these operations are equivalent. The decision mainly depends on the chosen platform. In general terms, in software implementations, squarings are usually faster and distinguishable from multiplications. To have strong protection against SSCA, then an adequate approach should involve atomic blocks that include squarings.

If squarings are to be distinguished from multiplications, YES at step 310, at step 320 the number of field multiplications and squarings found in an ECC point operation are determined.

At step 330, a balanced number of field multiplications and squarings should be determined in such a way that the minimum number of atomic blocks is required for the given ECC point operation. Such decisions should take into consideration the atomic structure to be used (and also considering that the same atomic structure should be applied to all the available ECC point operations). For instance, the following atomic structures: S-N-A-M-N-A-A (squaring-negation-addition-multiplication-negation-addition-addition) or S-N-A-A-M-N-A-A (squaring-negation-addition-addition-multiplication-negation-addition-addition) may be utilized. Note that squaring is included into the atomic structure, which not only speeds up computations since squaring is usually faster than multiplication, but also protects against potential attacks that are able of distinguishing multiplication from squaring. At this step, the method detailed in FIG. 4 and disclosed in pending U.S. application Ser. No. 11/855,563 filed Sep. 14, 2007 can be used to achieve the balanced number of multiplications and squarings. Thus, multiplications are traded by 1, 2 or more squarings according to the given ECC point operation.

Figure 4:
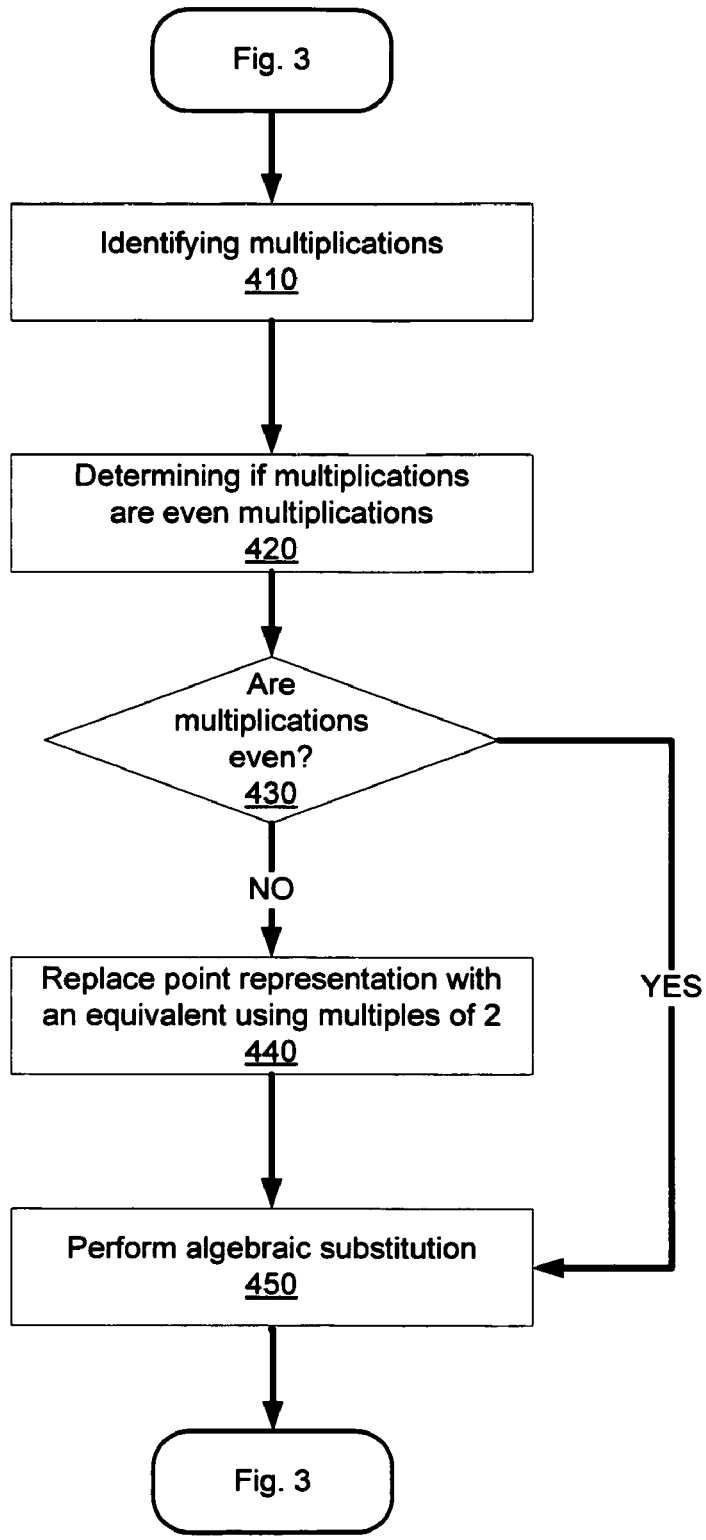
FIG. 4 is a flow diagram showing the method of replacing multiplication by squarings and other cheaper field operations.

Now referring to FIG. 4, at step 410, the method involves first identifying field multiplications a.b that can be replaced by 1, 2 or 3 squarings as given by:

$$ab = \tfrac{1}{2}[(a+b)^2 - a^2 - b^2] \qquad (5)$$

Determining which multiplications fall in this category if using (5) mainly depends on whether values $a^2$, $b^2$ or both pre-exist in the ECC point operation. For instance, in sequential implementations replacing one multiplication by one squaring is of benefit since the former is generally more time consuming than the latter. However, if 2 or 3 squarings replace one multiplication, then the execution becomes slower. Hence, in this setting both $a^2$ and $b^2$ should pre-exist in the ECC point operation to make practical the aforementioned substitution and essentially trade a.b for $(a+b)^2$.

At step 420, it is determined if some of the multiplications to be traded are not even (i.e., do not contain a multiple of 2 in their execution). If at least one of the multiplications is not even at decision step 430, the current point representation is replaced by an equivalent one that inserts the necessary multiple of 2 into the odd multiplication(s). The equivalent point is taken from the equivalence class for projective coordinates given by:

$$(X:Y:Z) = \{(\lambda^c X, \lambda^d Y, \lambda Z) : \lambda \in K^*, c, d \in Z^+\},$$

where $\lambda = 2t$, $t \in Z^+$.

Once multiplications to be traded are even, at step 450 they are replaced by applying the following algebraic substitutions, which hold for prime fields:

$$2ab = (a+b)^2 - a^2 - b^2 \qquad (6)$$

For instance, for the point addition in generic elliptic curves traditionally containing 8 multiplications and 3 squarings:

$$X_3 = \alpha^2 - \beta^3 - 2X_1\beta^2,$$

$$Y_3 = \alpha(X_1\beta^2 - X_3) - Y_1\beta^3,$$

$$Z_3 = Z_1\beta,$$

where: $\alpha = Z_1^3 Y_2 - Y_1$, $\beta = Z_1^2 X_2 - X_1$, it is possible to achieve a balanced number of multiplications and squarings by following the method described previously, which yields the following:

$$X_3 = \alpha^2 - 4\beta^3 - 2\theta,$$

$$Y_3 = \alpha(\theta - X_3) - 8Y_1\beta^3,$$

$$Z_3 = (Z_1 + \beta)^2 - Z_1^2 - \beta^2,$$

where: $\alpha = Z_1^3 Y_2 - Y_1$, $\beta = Z_1^2 X_2 - X_1$, $\theta = (X_1 - \beta^2)^2$. This formula costs 6 multiplications and 6 squarings.

In the previous example, the new point representation $(4X_3, 8Y_3, 2Z_3)$, equivalent to $(X_3, Y_3, Z_3)$, uses multiples of 2 and makes possible substitutions of the form $2ab = (a+b)^2 - a^2 - b^2$ for $Z_3$ and $\theta$, respectively.

Balancing and fixing the computing cost to 6 multiplications and 6 squarings makes the point addition require only 6 S-N-A-M-N-A-A atomic blocks in contrast to the original 11 M-A-N-A atomic blocks, which represents a significant reduction in execution time.

Returning to FIG. 3, if NO at step 310, squarings are presumed not to be distinguishable from multiplications, as can be the case of hardware platforms where usually a multiplier executes both kinds of operations, then an approach assuming that squarings and multiplications are equivalent is more flexible and faster.

Following the latter, at step 350, the number of field multiplications (including squarings) should be determined in such a way that the minimum number of field operations is required for the given ECC point operation. Such determination takes into consideration the atomic structure to be used (and also considering that the same atomic structure is to be applied to all the required ECC point operations). For instance, the following new atomic structure: M-N-A-M-N-A-A (multiplication-negation-addition-multiplication-negation-addition-addition) may be utilized. Note that the previous structure permits to reduce the number of required additions when compared to the traditional M-A-N-A structure, so it would be particularly attractive for applications where the cost ratio field addition/multiplication is relatively high. For instance, the traditional doubling formula on generic curves over prime fields costs 4 multiplications and 4 squarings. Protecting it using M-A-N-A would require 8 blocks and a total cost of 8 multiplications and 16 additions. In contrast, by using M-N-A-M-N-A-A, the implementation of doubling reduces to only 4 blocks with a total cost of 8 multiplications and 12 additions.

Figure 5:
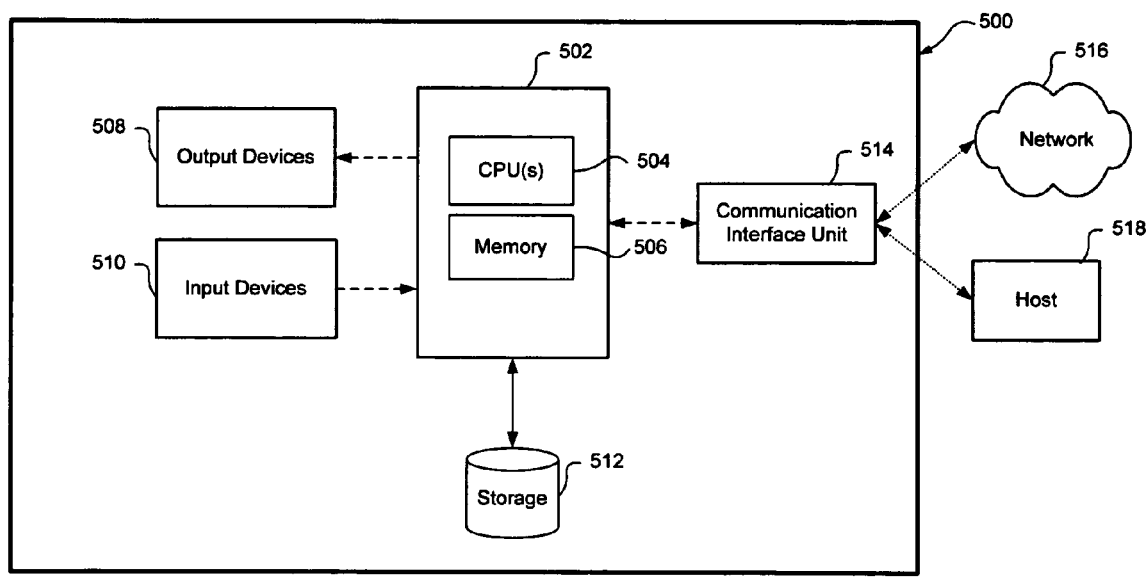
FIG. 5 is a block diagram illustrating an execution environment.

In FIG. 5, a computing environment 500 is provided in which an elliptic curve cryptosystem may be implemented as computer software in the form of computer readable code executed. The computing environment may be any number of computing or computer based platforms such as mobile devices, personal computer, notebook computers, personal digital assistants, networking devices such as routers, or be resident in application specific processors devices such as smart cards, security cards or radio frequency identification (RFID) devices requiring security implementations.

The computer 502 comprises central processing unit (CPU) 504 and memory 506. The CPU may be a single processor or multiprocessor system. In addition a multiprocessor implementation of the elliptic curve cryptosystem may utilize more than one computing environment for execution of a parallel architecture. In various computing environments, main memory 506 and storage 512 can reside wholly on computer environment 500, or they may be distributed between multiple computers.

Input devices 510 such as a keyboard and mouse may be coupled to a bi-directional system bus of a computer 502. The keyboard and mouse are for introducing user input to a computer 502 and communicating that user input to processor 504 if required. Computer 502 may also include a communication interface 514. Communication interface 514 provides a two-way data communication coupling via a network link to a network 516 by wired or wireless connection or may provide an interface to other host device 518 by a direct radio frequency connection. In any such implementation, communication interface 514 sends and receives electrical, electromagnetic or optical signals which carry digital data streams representing various types of information.

Communication between the communication interface unit 514 and the network 516 or host 518 use electrical, electromagnetic or optical signals which carry digital data streams. The signals through the various networks and the signals on network link and through communication interface, which carry the digital data to and from computer, are exemplary forms of carrier waves transporting the information. The computer 502 may also be able to display the results of the computation to a user in the form of output.

The computer processor 504 or similar device may be programmed in the manner of method steps, or may be executed by an electronic system which is provided with means for executing these steps. The storage device 512 provides a computer readable medium which may include both fixed and removable media, such as magnetic, optical or magnetic optical storage systems, Random Access Memory (RAM), Read Only Memory (ROM) or any other available mass storage technology. The storage device or media may be programmed to execute such method steps. As well, electronic signals representing these method steps may also be transmitted via a communication network.

Application code may be embodied in any form of computer program product. A computer program product comprises a medium configured to store or transport computer readable code, or in which computer readable code may be embedded. Some examples of computer program products are CD-ROM disks, ROM cards, floppy disks, magnetic tapes, computer hard drives, servers on a network, and carrier waves.

The method steps of the present disclosure may be embodied in sets of executable machine code stored in a variety of formats such as object code or source code. Such code is described generically herein as programming code, or a computer program for simplification. Clearly, the executable machine code or portions of the code may be integrated with the code of other programs, implemented as subroutines, plug-ins, add-ons, software agents, by external program calls, in firmware or by other techniques as known in the art. It will be apparent to persons skilled in the art that a number of variations and modifications can be made without departing from the scope of the invention as defined in the claims.

The invention claimed is:

1. A method of accelerating scalar multiplication in an elliptic curve-based cryptosystem by representing a scalar value with a multibase representation, the method executed in a processor comprising the steps of:
   a) selecting a set of bases and corresponding set of window values for performing an ECC scalar multiplication;
   b) calculating precomputed values according to selected bases and window values wherein the precomputed values are points of a form $d_iP$, where $d_i \in D^+ \setminus \{0\}$ and P is a point on a elliptic curve for which a ECC scalar multiplication kP is computed;
   c) determining a multibase representation of the scalar value; and
   d) scanning digits of the multibase representation from left to right until all the digits of the multibase representation are exhausted, performing a point operation of a form $a_jQ$ for every scanned digit with associated base $a_j \in A$, and performing an additional point addition of a form $Q=Q\pm d_iP$ if a digit has nonzero value $d_i$, where $d_iP$ is a point of the precomputed values and Q is a partial result of the scalar multiplication.

2. The method of claim 1 wherein the multibase representation is of a form:

$$k = \sum_{i=1}^{m} s_i \prod_{j=1}^{J} a_j^{c_j(j)},$$

where:
positive prime integers $a_1 \neq a_2 \neq \ldots \neq a_J$ are selected bases determining a set $A=\{a_1, \ldots, a_J\}$,
global base $a=a_1^{w_1} a_2^{w_2} \ldots a_J^{w_J}$ is set using a selected window set $\Omega = \{w_1, w_2, \ldots, w_J\}$ where $w_j \geq 0$ for $1 \leq j \leq J$,
$s_i$ are signed digits from a set $D \setminus \{0\}$, s.t. $|s_i| \geq 1$ and $s_i \in D \setminus \{0\}$, where the digit set is given by:

$$D = \left\{0, \pm 1, \pm 2, \ldots, \pm \left\lfloor \frac{a-1}{2} \right\rfloor \right\} \setminus \ldots \ldots \left\{\pm 1a_1, \pm 2a_1, \ldots, \pm \left\lfloor \frac{a-1}{2a_1} \right\rfloor a_1, \right.$$
$$\left. \pm 1a_2, \pm 2a_2, \ldots, \pm \left\lfloor \frac{a-1}{2a_2} \right\rfloor a_2, \ldots, \pm 1a_J, \pm 2a_J, \ldots, \pm \left\lfloor \frac{a-1}{2a_J} \right\rfloor a_J \right\},$$

$c_i(j)$ are decreasing exponents, s.t, $c_i(j) \geq c_{i+1}(j) + w_j \geq w_j$ for $1 \leq i \leq m-1$ and each $1 \leq j \leq J$, and
m is a length of the expansion.

3. The method of claim 2 wherein the step of determining a multibase representation further comprising the steps of:
   e) receiving the scalar value together with the selected set of bases A and windows $\Omega$;
   f) setting a zero digit with its associated base if any of the bases divides the scalar value, and updating the value of the scalar by dividing it by the selected base;
   g) if the scalar value is not divisible by any of the bases, approximating the scalar value k to the closest extreme in the window by performing an addition of a form $k=k \pm d_i$ where $d_i \in D^+ \setminus \{0\}$ wherein the window is delimited by two closest integers to the partial scalar value that are multiples of the global base and the corresponding digit is set to the nonzero value $\pm d_i$; and
   h) determining the base that divides the updated value of the scalar, associating the base to the nonzero digit from the c), and updating the value of the scalar by dividing it by the selected base.

4. The method of claim 2 further, wherein prior to calculating the precomputed value, further comprises the steps of:
   d) determining a number of multiplication operations and squaring operations in an ECC point operation; and
   e) balance the number of multiplication operations and squaring operations within the ECC point operation.

5. The method of claim 4 further, wherein at step e):
   f) identifying multiplication operations within the ECC point operation that can be replaced with squarings and other cheaper field operations to balance a number of field multiplications and squarings;
   g) determining if identified multiplication operations in the ECC point operation are even or odd multiplications;
   h) modifying the ECC point operation if the multiplication operations are odd, with an equivalent point representation utilizing multiples of two; and
   i) performing algebraic substitutions of the multiplication operations with squaring operations and other cheaper field operations such as addition, subtraction and multiplication or division by a small constant.

6. The method of claim 4 wherein at step c) the ECC point operation is modified using an equivalence class for projective coordinates:

$$(X:Y:Z) = \{(\lambda^c, X, \lambda^d, Y, \lambda Z) : \lambda \in K^* c, d \in Z^+\},$$

where $\lambda = 2t$, $t \in Z^+$, to insert multiples of 2.

7. The method of claim 4 further comprising the step of:
   j) defining an atomic structure for execution of the ECC point operations wherein the atomic structure is defined to be resistant to simple side channel attacks (SSCA) by levelling power dissipation, electromagnetic emission or any other information leakage by processor.

8. The method of claim 7 wherein the atomic structures to protect against SSCA are defined by performing the operations of Squaring-Negation-Addition-Multiplication-Negation-Addition-Addition (S-N-A-M-N-A-A) or Squaring-Negation-Addition-Addition-Multiplication-Negation-Addition-Addition (S-N-A-A-M-N-A-A).

9. The method of claim 2 further, wherein prior to calculating the precomputed value, comprising the step of:
   e) determining a number of multiplication operations in an ECC point operation; and
   f) defining an atomic structure for execution of the ECC point operations wherein the atomic structure is defined to be resistant to simple side channel attacks (SSCA) by levelling power dissipation, electromagnetic emission or any other information leakage by processor.

10. The method of claim 9 wherein the atomic structures to protect against SSCA are defined at step b) by performing the operations of Multiplication-Negation-Addition-Multiplication-Negation-Addition-Addition (M-N-A-M-N-A-A).

11. The method of claim 4 wherein the ECC point operations are on an elliptic curve defined by:

$$E: y^2 = x^3 + ax + b$$

where: $a, b \in F_p$ and $\Delta = 4a^3 + 27b^2 \neq 0$.

12. The method of claim 4 wherein the ECC point operations are on an elliptic curve defined by:

$$E: y^2 + xy = x^3 + ax^2 + b,$$

where: $a, b \in GF(2^m)$ and $\Delta = b \neq 0$.

13. The method of claim 4 wherein the ECC point operations are on a Hessian or Jacobi curve form, including but not limiting to Jacobi-intersection and Jacobi-quartic forms.

14. The method of claim 4 wherein the ECC point operations are based upon elliptic curves with degree ⅔ isogenies.

15. The method of claim 4 wherein the ECC point operations are on an Edward curve form.

16. An apparatus for accelerating scalar multiplication in an elliptic curve-based cryptosystem by representing a scalar value with a multibase representation, the apparatus comprising:
   a memory;
   a processor for performing the steps of:
   a) selecting a set of bases and corresponding set of window values for performing an ECC scalar multiplication;
   b) calculating precomputed values according to selected bases and window values wherein the precomputed values are points of a form $d_i P$, where $d_i \in D^+ \setminus \{0\}$ and P is a point on a elliptic curve for which a ECC scalar multiplication kP is computed;
   c) determining a multibase representation of the scalar value; and
   d) scanning digits of the multibase representation from left to right until all the digits of the multibase representation are exhausted, performing a point operation of a form $a_j Q$ for every scanned digit with associated base $a_j \in A$, and performing an additional point addition of a form $Q = Q \pm d_i P$ if a digit has nonzero value $d_i$, where $d_i P$ is a point of the precomputed values and Q is a partial result of the scalar multiplication.

17. The apparatus of claim 16 wherein the multibase representation is of a form:

$$k = \sum_{i=1}^{m} s_i \prod_{j=1}^{J} a_j^{c_i(j)},$$

where:
   positive prime integers $a_1 \neq a_2 \neq \ldots \neq a_J$ are selected bases determining a set $A = \{a_1, \ldots, a_J\}$,
   global base $a_1^{w_1} a_2^{w_2} \ldots a_J^{w_J}$ is set using a selected window set $\Omega = \{w_1, w_2, \ldots, w_J\}$, where $w_j \geq 0$ for $1 \leq j \leq J$,
   $s_i$ are signed digits from a set $D \setminus \{0\}$, s.t. $|s_i| \geq 1$ and $s_i \in D \setminus \{0\}$, where the digit set is given by:

$$D = \left\{0, \pm 1, \pm 2, \ldots, \pm \left\lfloor \frac{a-1}{2} \right\rfloor \right\} \setminus \ldots \ldots \left\{ \pm 1 a_1, \pm 2 a_1, \ldots, \pm \left\lfloor \frac{a-1}{2 a_1} \right\rfloor a_1, \right.$$
$$\left. \pm 1 a_2, \pm 2 a_2, \ldots, \pm \left\lfloor \frac{a-1}{2 a_2} \right\rfloor a_2, \ldots, \pm 1 a_J, \pm 2 a_J, \ldots, \pm \left\lfloor \frac{a-1}{2 a_J} \right\rfloor a_J \right\},$$

$c_i(j)$ are decreasing exponents, s.t, $c_i(j) \geq c_{i+1}(j) + w_j \geq w_j$ for $1 \leq i \leq m-1$ and each $1 \leq j \leq J$, and
   m is a length of the expansion.

18. The apparatus of claim 16 wherein the apparatus is an radio frequency identification device (RFID) device.

19. A computer readable memory containing instructions for accelerating scalar multiplication in an elliptic curve-based cryptosystem by representing a scalar value with a multibase representation, the instructions which when executed by a processor perform the steps of:
   a) selecting a set of bases and corresponding set of window values for performing an ECC scalar multiplication;
   b) calculating precomputed values according to selected bases and window values wherein the precomputed values are points of a form $d_i P$, where $d_i \in D^+ \setminus \{0\}$ and P is a point on a elliptic curve for which a ECC scalar multiplication kP is computed;
   c) determining a multibase representation of the scalar value; and
   d) scanning digits of the multibase representation from left to right until all the digits of the multibase representation are exhausted, performing a point operation of a form $a_j Q$ for every scanned digit with associated base $a_j \in A$, and performing an additional point addition of a form $Q = Q \pm d_i P$ if a digit has nonzero value $d_i$, where $d_i P$ is a point of the precomputed values and Q is a partial result of the scalar multiplication.

20. The computer readable memory of claim 19 wherein the multibase representation is of a form:

$$k = \sum_{i=1}^{m} s_i \prod_{j=1}^{J} a_j^{c_j(j)},$$

where:
   positive prime integers $a_1 \neq a_2 \neq \ldots \neq a_J$ are selected bases determining a set $A = \{a_1, \ldots, a_J\}$, global base $a = a_1^{w_1} a_2^{w_2} \ldots s_J^{w_2}$ is set using a selected window set $\Omega = \{w_1, w_2, \ldots, w_J\}$ where $w_j \leq 0$ for $1 \leq j \leq J$, $s_i$ are signed digits from a set $D \setminus \{0\}$, s.t, and $|s_i| \geq 1$ and $s_i \in D \setminus \{0\}$, where the digit set is given by:

$$D = \left\{0, \pm 1, \pm 2, \ldots, \pm \left\lfloor \frac{a-1}{2} \right\rfloor \right\} \setminus \ldots \ldots \left\{\pm 1 a_1, \pm 2 a_1, \ldots, \pm \left\lfloor \frac{a-1}{2a_1} \right\rfloor a_1, \right.$$

-continued $$\left. \pm 1 a_2, \pm 2 a_2, \ldots, \pm \left\lfloor \frac{a-1}{2a_2} \right\rfloor a_2, \ldots, \pm 1 a_J, \pm 2 a_J, \ldots, \pm \left\lfloor \frac{a-1}{2a_J} \right\rfloor a_J \right\},$$

$c_i(j)$ are decreasing exponents, s.t, $c_i(j) \geq c_{i+1}(j) + w_j \geq w_j$ for $1 \leq i \leq m-1$ and each $1 \leq j \leq J$, and $m$ is a length of the expansion.

* * * * *